Patented May 5, 1936

2,039,303

UNITED STATES PATENT OFFICE 2,039,303

MANUFACTURE OF ARTIFICIAL MATERIALS

Henry Dreyfus, London, England

No Drawing. Application August 7, 1930, Serial No. 473,782. In Great Britain October 17, 1929

18 Claims. (Cl. 106—40)

This invention is a continuation in part of United States patent application S. No. 473,781, filed Aug. 7, 1930 corresponding to British application No. 30804/29 and relates to the production of artificial filaments, threads, yarns, ribbons, fabrics and other materials and is more particularly concerned with new or improved processes for the production of films, threads and other materials of reduced, subdued or modified lustre.

In my United States patent application S. No. 473,781 corresponding to British application No. 30804/29 I have described the production of artificial products having subdued, reduced or modified lustre by incorporating therein organic substances in a quantity greater than is soluble in the cellulose acetate or other base, of which the filaments, ribbons, films or other materials consist or which they contain. The organic substances used are preferably insoluble or substantially insoluble in or incompatible with the base, and moreover are preferably insoluble in water, in dilute acids or alkalies or like reagents and insoluble in the common organic solvents and preferably have a very high melting point.

According to the present invention artificial products having a subdued, reduced or modified lustre are produced by incorporating therein natural or synthetic resins having a melting point of at least 200° C. in a quantity greater than is soluble in or compatible with the base, for example cellulose acetate, of which the filaments, ribbons, or other materials consist or which they contain. The natural or synthetic resins employed are of course insoluble in aqueous liquids and furthermore are preferably insoluble in the common organic solvents.

The invention is more particularly applicable to the production of filaments, threads, ribbons or other products from organic solutions of cellulose acetate or other derivatives, for example cellulose formate, cellulose propionate, cellulose butyrate or other cellulose esters including cellulose nitrate or of methyl cellulose, ethyl cellulose or benzyl cellulose or other cellulose ethers, but it may also be applied to the production of filaments or other products from solutions of other bases, for example aqueous solutions of viscose or other base used for the manufacture of filaments or other products of the cellulosic type.

Many of the soft resins are appreciably soluble in or miscible with cellulose acetate or other cellulose derivatives and for this reason in its application to materials made of or containing cellulose derivatives, the present invention more particularly contemplates the use of hard or very hard natural or synthetic resins. Resins having a softening or melting point above 200° C. are contemplated and I prefer to employ resins having a melting point above 250 to 260° C. or even above 290 to 300° C. Example of such resins are Zanzibar copal amongst the natural resins and infusible synthetic resins of the phenol-aldehyde type, e. g. Bakelite C, of the type obtained by condensation of formaldehyde with urea, thiourea or their derivatives and of the type obtained by the condensation of polyhydric alcohols with poly-basic acids or their anhydrides, e.g. the product known as Glyptal obtained by condensation of glycerine with phthalic anhydride. All these synthetic resins may be obtained in an infusible form and substantially insoluble in organic solvents. Resins of lower melting point down to 200° C. or resins which are soluble in organic solvents are however not excluded from the ambit of the present invention, but their use is less advantageous. Examples of somewhat softer resins are:—White Angola copal, hard Manila copal, Congo copal, Sierra Leone copals and certain synthetic resins, e. g. the extra hard or kauri "Albertols" obtained by heating phenol-formaldehyde resins with kauri copal resin.

Resins which are soluble in organic solvents may be incorporated in organic solutions of cellulose derivatives used for spinning purposes by simple solution methods. Frequently however the solvents suitable for dissolving the resins are not the customary solvents employed for the manufacture of artificial filaments and the like. Mixed organic solvents may be employed for obtaining a solution both of the cellulose derivative and the resin. For example in the case of cellulose acetate, acetone is the common solvent employed for the manufacture of artificial filaments, but in general this liquid has insufficient solvent power for the resins contemplated in the present invention. The resins may however be dissolved in hydrocarbons, esters etc., and such solutions mixed with acetone solutions of cellulose acetate in such proportions that the cellulose acetate is not precipitated. The resin itself may either remain in solution or be precipitated in which case it is usually precipitated in a sufficiently finely divided form.

As indicated above I prefer to use for the purpose of the present invention natural or synthetic resins which are insoluble in the common organic solvents. Such resins may be dispersed or suspended in the spinning solutions by any convenient method. They may for example be brought to the requisite state of sub-division by mechanical means and the finely ground resins may then be rubbed up with the solvent used for making up the spinning solution or with a constituent thereof or with the spinning solution itself to obtain the required suspension. Alternatively a suitable suspension or dispersion may be obtained directly by mechanically grinding the resin in the presence of the solvent or in the presence of a portion of the spinning solution, for example in the so-called colloid mills. The degree of sub-division of the resin should preferably be such as to enable the spinning solution to be spun without causing obstructions in the spinning dies or other parts of the apparatus. The resins may be sufficiently fine-divided or dispersed to enable them to pass through the filters, so that they may be incorporated in the spinning solution before filtration. If desired any dry or wet mechanical or other dispersion of the resins may take place in the presence of the cellulose acetate or other base used for the manufacture of artificial materials.

To enable the resins to pass the spinning nozzles and/or filters without causing obstruction it is usually sufficient to attain an average particle size of about .003 millimetre, though higher particle sizes, such as up to .006 millimetre, may be used without seriously impeding the spinning operation. In order to obtain the maximum modification of lustre it is preferable to reduce the particle size to below .003 millimetre, for example down to .0001-.0005 millimetre. This may be effected by grinding either dry or in the presence of liquids, for example water or the solvent to be used for making up the spinning solution, e. g. acetone. Or again the resin may be ground in the presence of the spinning solution itself or a portion thereof, e. g. in presence of an acetone solution of cellulose acetate. The finely divided resin if not already incorporated in the solvent for the spinning solution or in the spinning solution itself may be worked therewith in any desired manner. The state of dispersion may be improved by carrying out either the initial grinding if used or the working with the solvent or spinning solution in presence of dispersators and/or protective colloids, for example Turkey red oil (preferably applied in relatively small proportions) and/or in presence of oils, such as oleic acid, linseed oil, olive oil or the like. Aqueous or oily pastes of the resin may be worked with the solvent or with the spinning solution as before.

Preferably the resin has as uniform a particle size as possible, and to effect this a suitable grading of the particles prior to incorporation in the solvent or in the spinning solution may be effected, for example by means of a cyclone separator or other means whereby the finer particles are carried off by a current of air or other gas with subsequent fractional settling from the gas current.

As indicated above the hard or harder resins are particularly valuable for use in the manufacture of materials from cellulose derivatives. It is to be noted however that the presence of high boiling solvents or plasticizers tends to increase the solubility or compatibility of the resins in the cellulose derivatives, so that if spinning solutions containing high boiling solvents or plasticizers are used, the proportion of such high boiling solvents or plasticizers should be so regulated that the resin does not become completely soluble in or compatible with the cellulose derivative.

The resins employed are preferably white or colourless or as nearly white or colourless as possible. The effect of any yellow tint of the resin may however if desired be eliminated or reduced by incorporation of a substance of complementary colour, such incorporation being effected either directly in the spinning solution or in the filaments, threads or other products after manufacture.

If desired the resins may be incorporated in the materials together with inorganic or organic pigments and particularly white pigments, for example titanium oxide, zinc oxide, barium sulphate, silica and the like. Such pigments are preferably intimately incorporated in the resins before their introduction into the spinning solution for manufacturing artificial materials. This intimate incorporation may for example take place in the case of synthetic resins by introducing the pigment in the course of manufacturing the synthetic resins or by forming the pigment by chemical reaction in the reaction mixture used for such manufacture. The introduction will in general take place before the synthetic resin has reached the infusible stage.

The proportion in which the resin is incorporated in the cellulose acetate or other base may be varied according to the nature of the base and the type of resin employed. For example in general it may be stated that in the case of cellulose derivatives to obtain an equal modification of the lustre, larger quantities of the softer hard resins will be required than of the very hardest resins. I prefer not to use the resin in a quantity greater than about 20% of the weight of the cellulose derivative and preferably much smaller quantities, such as a ½ to 1 or 2 or 5% of the resin relative to the cellulose derivative are employed.

The spinning solutions in which have been incorporated resins may be spun by dry or wet spinning methods. Dry spinning may take place in the normal way, but in the case of wet spinning a coagulating bath may be used in which the resin is substantially insoluble. If as is preferred resins are employed which are insoluble in the common organic solvents, almost any coagulating bath may be used.

Effects may be produced by twisting, weaving, knitting or otherwise associating the filaments of modified lustre with the normal lustrous filaments of cellulose acetate or of other artificial silks or fibres or by associating the new filaments with other fibres, such as cotton, wool and the like. In addition yarns or threads containing both the filaments or the like of subdued or modified lustre and filaments or the like of normal lustre may be produced by twisting together dull filaments from one spinning nozzle with bright or normal lustrous filaments from another spinning nozzle, the twisting being effected continuously with production. Or again part of the jet orifices of a single nozzle may be fed with a spinning solution containing an insoluble substance and the remaining part of the jet orifices fed with normal spinning solution. The dull and bright filaments extruded from the single spinning jet may then be associated and/or twisted as desired. Fabrics prepared from such "mixed" yarns or threads exhibit valuable effects. Filaments of subdued lustre obtained according to this invention may be united to each other and/or to filaments of normal lustre so as to obtain special monofil threads, for example, by associating several filaments while the latter still retain some of the solvent and are tacky or sticky, or by applying to individual filaments a substance which will exert a solvent or softening action thereon and subsequently associating the thus treated filaments while they are in a tacky condition.

If desired the reduced, subdued, or modified lustre effects of the present invention may be enhanced by applying the present processes in conjunction with the processes described in United States Patents Nos. 1,957,508 and 1,938,646 and U. S. application S. No. 473,781 filed August 7, 1930, or other processes designed to modify the lustre of the artificial materials.

As already indicated the invention is more particularly applicable to the production of filaments, yarns, ribbons or other products from solutions containing cellulose acetate or other cellulose esters or ethers and is especially useful for spinning such solutions by the dry spinning method. The invention may, however, also be applied to the production of filaments or other products of reduced, subdued or modified lustre from solutions of other bases, for example viscose or other base used for the manufacture of filaments or other products of the cellulosic type.

What I claim and desire to secure by Letters Patent is:—

1. Artificial extrusion products of cellulose acetate having a modified lustre due to the presence therein of fine particles of a synthetic resin insoluble in organic solvents.

2. Artificial extrusion products of cellulose acetate having a modified lustre due to the presence therein of fine particles of an insoluble, infusible resin of the phenol-formaldehyde type.

3. Artificial extrusion products of cellulose acetate having a modified lustre due to the presence therein of fine particles of an insoluble, infusible resin of the formaldehyde urea type.

4. Artificial extrusion products of cellulose acetate having a modified lustre due to the presence therein of fine particles of an insoluble, infusible resin of the glyptal type.

5. Artificial extrusion products having a basis of cellulosic material and having a modified lustre due to the presence therein as a disperse phase of fine particles of a resin which does not melt below 200° C.

6. Artificial extrusion products of organic derivatives of cellulose and having a modified lustre due to the presence therein as a disperse phase of fine particles of a resin which does not melt below 200° C.

7. Artificial extrusion products of cellulose acetate and having a modified lustre due to the presence therein as a disperse phase of fine particles of a resin which does not melt below 200° C.

8. Artificial extrusion products of organic derivatives of cellulose and have a modified lustre due to the presence therein as a disperse phase of fine particles of a resin which does not melt below 250° C.

9. Artificial extrusion products having a basis of cellulosic material and having a modified lustre due to the presence therein as a disperse phase of fine particles of inorganic pigment and of a resin which does not melt below 200° C.

10. Artificial extrusion products of cellulose acetate having a modified lustre due to the presence therein as a disperse phase of fine particles of inorganic pigment and of a resin which does not melt below 200° C.

11. A spinning solution for the manufacture of artificial filaments, threads, yarns, ribbons and like products of modified lustre which has a basis of cellulosic material and which contains as a disperse phase fine particles of a resin which does not melt below 200° C. and which is insoluble in the solvent medium of the solution.

12. A spinning solution for the manufacture of artificial filaments, threads, yarns, ribbons and like products of modified lustre, which comprises cellulose acetate dissolved in a volatile organic solvent therefor, and which contains as a disperse phase fine particles of a resin which does not melt below 200° C. and which is insoluble in said organic solvent.

13. A spinning solution for the manufacture of artificial filaments, threads, yarns, ribbons and like products of modified lustre, which comprises cellulose acetate dissolved in a volatile organic solvent therefor, and which contains as a disperse phase fine particles of a synthetic resin which does not melt below 250° C. and which is insoluble in said organic solvent.

14. A spinning solution for the manufacture of artificial filaments, threads, yarns, ribbons and like products of modified lustre, which has a basis of cellulose acetate and which contains as a disperse phase fine particles of an insoluble infusible resin of the phenol formaldehyde type.

15. A spinning solution for the manufacture of artificial filaments, threads, yarns, ribbons and like products of modified lustre, which has a basis of cellulose acetate and which contains as a disperse phase fine particles of an insoluble infusible resin of the formaldehyde urea type.

16. A spinning solution for the manufacture of artificial filaments, threads, yarns, ribbons and like products of modified lustre, which has a basis of cellulose acetate and which contains as a disperse phase fine particles of an insoluble infusible resin of the glyptal type.

17. Process for the manufacture of artificial filaments, threads, yarns, ribbons and like products of modified lustre, which comprises forming a solution having a basis of cellulosic material and containing as a disperse phase fine particles of a resin which does not melt below 200° C., and spinning said solution into a setting medium.

18. Process for the manufacture of artificial filaments, threads, yarns, ribbons and like products of modified lustre, which comprises forming a solution containing cellulosic material and as a disperse phase fine particles of an inorganic pigment and of a resin which does not melt below 200° C., and spinning said solution into a setting medium.

HENRY DREYFUS.